(12) United States Patent
Skov et al.

(10) Patent No.: US 6,364,978 B1
(45) Date of Patent: Apr. 2, 2002

(54) METHOD AND APPARATUS FOR PRODUCING A FILTER MATERIAL

(75) Inventors: Martin Skov; Heinz Wandel, both of Walddorfhaslach (DE)

(73) Assignee: Moldex-Metric, Inc., Culver City, CA (US)

(*) Notice: Subject to any disclaimer, the term of this patent is extended or adjusted under 35 U.S.C. 154(b) by 0 days.

(21) Appl. No.: 09/389,846

(22) Filed: Sep. 2, 1999

(51) Int. Cl.[7] ................................................ B32B 31/16
(52) U.S. Cl. ...................... 156/73.1; 156/204; 156/210; 156/227; 156/269; 156/470; 156/498; 156/499
(58) Field of Search .................... 156/73.1, 196, 156/199, 204, 210, 227, 269, 311, 459, 470, 498, 499, 580, 580.1, 580.2, 583.1

(56) References Cited

U.S. PATENT DOCUMENTS

| | | | |
|---|---|---|---|
| 4,940,500 A | * 7/1990 | Tadokoro et al. | ............ 156/204 |
| 5,167,740 A | * 12/1992 | Michaelis et al. | ......... 156/73.1 |
| 5,804,073 A | * 9/1998 | Ter Horst | ................. 210/493.3 |
| 5,868,889 A | * 2/1999 | Kahler | .......................... 156/204 |

* cited by examiner

*Primary Examiner*—James Sells
(74) *Attorney, Agent, or Firm*—Charles H. Schwartz

(57) ABSTRACT

A method and an apparatus for producing a thermoplastic filter material laid in folds, with the folds fixed in close vicinity. The thermoplastic filter material which has been heated for forming the folds is accumulated within a cooling path such that the folds are pushed together and fixed by cooling with respect to their shape.

9 Claims, 1 Drawing Sheet

METHOD AND APPARATUS FOR PRODUCING A FILTER MATERIAL

BACKGROUND OF THE INVENTION

The present invention relates to a method for producing a thermoplastic filter material, which has been heated for lying in folds and to an apparatus used therefor.

A filter material produced with the known method is known from German Utility Model 93 19 372. In the known filter material, cover layers are folded together with the filter material proper for ensuring that the folds are kept open also under pressure load by the medium flowing there through, i.e. that the folds do not collapse, whereby the passage resistance would be increased. Furthermore, the folds are held together by a cover layer which extends over the backs of the folds. However, during further processing, for instance for obtaining filter inserts, it is difficult to keep the folds of the filter material in such a close vicinity as is required for the filter material shown in FIG. 1 of said utility model.

Thus it is the object of the present invention to provide a method of producing a folded filter material in which the folds are fixed in a constructional simple manner in close vicinity to each other.

SUMMARY OF THE INVENTION

The object is achieved by a method and apparatus in which the thermoplastic filter material which has been heated for forming the folds is accumulated in a cooling path such that said folds are pushed together and fixed by cooling with respect to their shape.

On the one hand, the spaces that are created by the thickness of the folding tools are eliminated between the folds thanks to the measure that the folds are pushed together following the heating operation and the laying in folds. On the other hand, these folds are fixed by cooling, so that it becomes much easier to pass the folds in a densely packed state to or through subsequent steps of the method.

Advantageous developments of the method according to the invention can be gathered from the following description:

DETAILED DESCRIPTION OF THE PREFERRED EMBODIMENT

Figure 1:
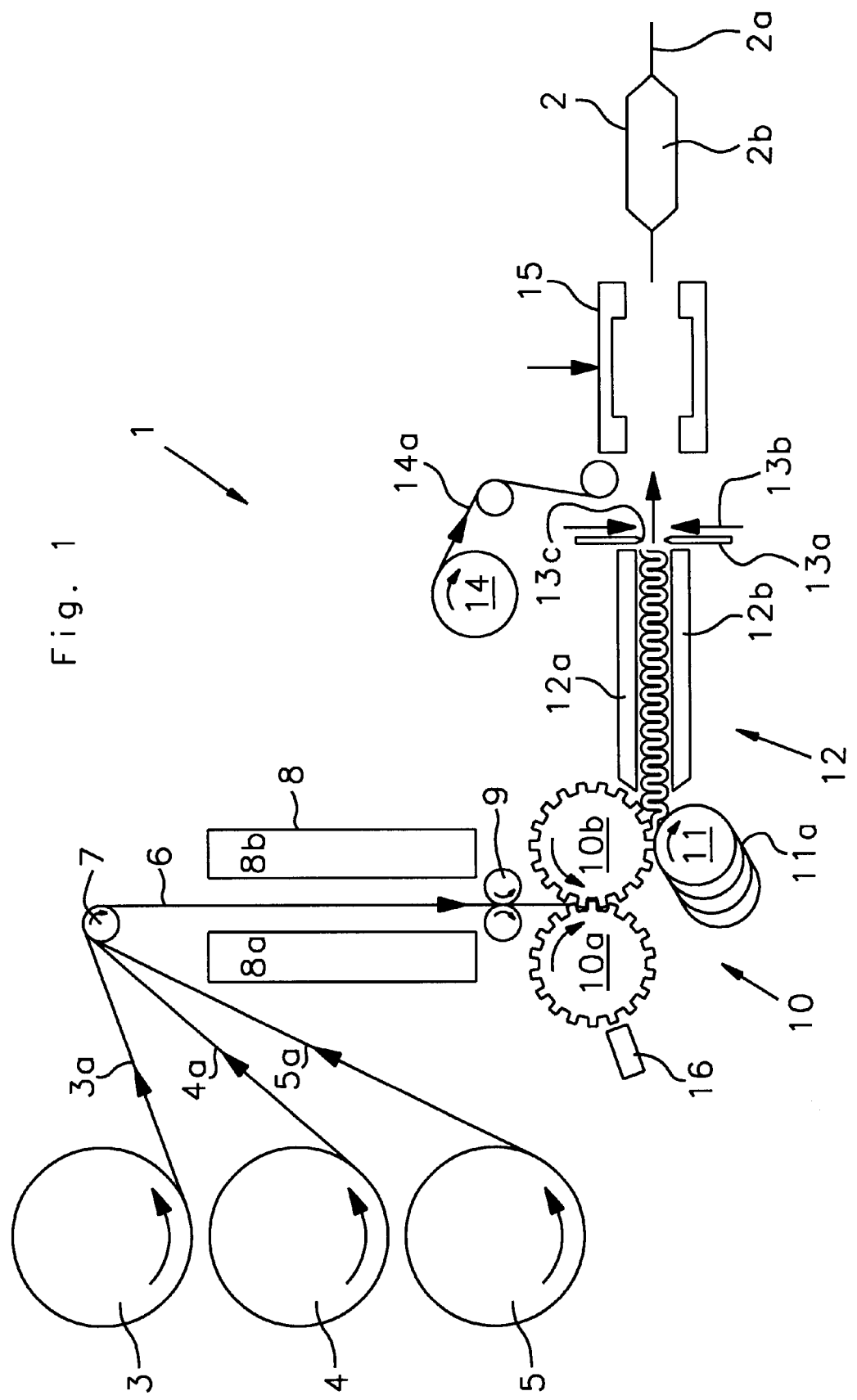
FIG. 1 shows an embodiment of an apparatus according to the invention for carrying out a method according to the invention.

FIG. 1 schematically illustrates an apparatus 1 for producing round, disc-like filter inserts 2, e.g. in the manner of a filter element according to German Utility Model 93 19 372. In the illustrated embodiment, the apparatus 1 contains three supply rolls 3, 4, 5 for supplying three initial layers for producing a filter material. The supply roll 3, for instance, contains a web 3a of wide-meshed support netting consisting of a suitable thermoplastic material, such as ethylene vinyl acetate (EVA). The supply roll 4 contains a web 4a of the film material proper, for instance a particle filter or a base material coated with activated carbon, possibly covered by a cover material, or the like. The third supply roll 5 contains web 5a of a suitable cover material, for instance a spun-bonded fabric of polypropylene.

The webs 3a, 4a and 5a of the supply rolls 3 to 5 which are united to form the filter material 6 are jointly guided over a guide roll 7 so that they enter a heating device 8 as a multi-layered straight web. The heating device 8 contains two heating plates 8a and 8b which are arranged at both sides of the filter material 6 and between which the filter passes there through. The temperature of the heating plates 8a, 8b is set to the lowest softening temperature of the webs 3a, 4a, 5a which have been united to form the filter material 6, and is below the melt temperature of the web having the lowest melting point, whereby it is ensured that the filter material 6 is thermoplastically deformable, but does not lose its permeability because of melting.

Subsequently, the filter material 6 is passed by two guide rolls 9 between a first toothed roll 10a and a second toothed roll 10b that are in meshing engagement with each other. The toothed rolls 10a and 10b are provided with axially extending teeth having the same tooth shape and pitch, but are in meshing engagement in offset fashion with respect to each other, so that the filter material 6 passing there through is laid in folds between said toothed rolls 10a and 10b. Subsequently, the conveying direction of the filter material 6 is changed by about 90°, so that the filter material remains on the tooth rows of the toothed roll 10b while being guided past a hot roll 11. The hot roll 11 has a temperature of about 150° C. and is provided on its circumference with axially spaced-apart annular webs 11a which have such a distance from the tooth tips of the toothed roll 10b that the three layers 3a, 4a and 5a of the filter material 6 are in points more strongly connected at the contact points of the annular webs with the tooth tips than has already been accomplished by heating and folding. A fuller explanation of the toothed rolls 10a and 10b and hot roll 11 may be had with reference to co-pending application Sser. No. 09/389,847 filed at the same time as this application and having the same inventors and assignee, and the description in the co-pending application is incorporated in this application.

Subsequently, the filter material 6 which has been laid in folds is pushed into a cooling path 12 by the conveying pressure, with the cooling path 12 including at least one upper and one lower cooling plate 12a and 12b, but being preferably closed in the manner of a channel. When viewed in the conveying direction of the filter material 6, the cooling path 12 has a sufficient length to ensure that the filter material 6 is completely cooled down.

At the exit end of the cooling path 12, there is provided a movable stop 13a, movable as shown by arrows 13b in FIG. 1, which can be moved into the conveying path of the filter material 6 in the cooling path 12 and can be removed therefrom. The stop 13a is expediently coupled with a cutting device 13c which cuts the filter material into the longitudinal sections required for producing the filter elements 2. The filter material is pushed together by the conveying pressure prevailing inside the cooling path by partly or completely closing the cooling path 12 by the stop so that the distances created by the thickness of the teeth of the toothed rolls 10a, 10b are eliminated between the folds, and the material is cooled in the cooling path 12 for fixing the folds in the state where it is pushed together.

Subsequently, a cover layer 14a can be applied by a further supply roll 14 to the filter material sections and fixed in such a manner that it overlaps the backs of the folds and helps to keep the folds together. The filter material then passes in sections through an ultrasonic welding or sealing device 15 which presses the filter material 6 together in an annular portion and melts it, thereby welding the material into a surrounding sealing edge 2a while the filter material 2b which is laid in folds substantially maintains its original shape within the annular sealing edge 2a. The ultrasonic welding device 15 can simultaneously punch out the round, disc-like filter elements 2 from the filter material sections.

The above-described method can be carried out automatically, for instance, by providing a counter 16 on the toothed roll 10a for determining the number of the folding teeth passing past the counter and for operating the stop and cutting device 13 after a predetermined number of folds and, in time delayed fashion, also the ultrasonic device 15.

In a modification of the described and drawn embodiment, filter materials can be made from different material layers, both with respect to number and with respect to material composition, provided at least one layer is thermally deformable. The filter material need not necessarily be heated by heating plates, but can e.g. directly be heated via folding rolls or toothed rolls. Toothed rolls are not imperative as the fold-laying device, but it is also possible to use toothed plates or other suitable fold laying devices. Nor is it imperative to perform the cooling operation between cooling plates, but it can e.g. be carried out by air current. A conical tapering cooling path can, for example, be provided as a stop, or other measures can be taken that the folds are automatically pushed together, for instance, through increased friction of the fold back on a counter surface.

What is claimed is:

1. A method of producing a thermoplastic filter material laid in folds by rollers, characterized in that the thermoplastic filter material is heated for forming the folds by rollers and is accumulated in a cooling path such that said folds are pushed together and fixed by cooling with respect to their shape.

2. A method according to claim 1, characterized in that said filter material is heated in a two-dimensional state prior to the formation of said folds.

3. The method according to claim 1, characterized in that said filter material is made from at least two layers which are united prior to the formation of said folds and are connected to each other after said folds have been formed and before said folds are pushed together.

4. The method according to claim 1 characterized in that said filter material is provided with an unfolded cover material after said folds have been formed and pushed together.

5. The method according to claim 1 characterized in that said filter material is formed into filter inserts after said folds have been pushed together.

6. The method according to claim 5 characterized in that said filter inserts are provided with a thermomolded sealing edge which simultaneously fixes said folds.

7. The method according to claim 6 characterized in that said thermomolded sealing edge is produced by ultrasonic action.

8. The method according to claim 6 characterized in that said filter insert is punched out from said filter material after said sealing edge has been formed.

9. An apparatus for producing a filter material laid in folds, comprising a device for heating said filter material, a fold laying roller device for folding the heated filter material and a cooling device including a stop at which said folded heated filter material can be accumulated and cooled to be fixed in shape.

* * * * *